US012699368B2

(12) United States Patent
Forbes

(10) Patent No.: US 12,699,368 B2
(45) Date of Patent: Aug. 4, 2026

(54) PREDICTIVE FEEDFORWARD CONTROL ALLOWING DEDICATED CONTROL OF SOME VARIABLES WHILE MINIMIZING IMPACT ON OTHER VARIABLES

(71) Applicant: Honeywell international inc., Charlotte, NC (US)

(72) Inventor: Michael Forbes, North Vancouver (CA)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 366 days.

(21) Appl. No.: 18/426,196

(22) Filed: Jan. 29, 2024

(65) Prior Publication Data

US 2025/0244727 A1     Jul. 31, 2025

(51) Int. Cl.
*G05B 13/04*          (2006.01)

(52) U.S. Cl.
CPC ......... *G05B 13/041* (2013.01); *G05B 13/048* (2013.01)

(58) Field of Classification Search
CPC ................................................... G05B 13/041
USPC .......................................................... 700/28
See application file for complete search history.

(56) References Cited

U.S. PATENT DOCUMENTS

| | | | |
|---|---|---|---|
| 6,807,510 B1 | 10/2004 | Backstrom | |
| 7,454,253 B2 | 11/2008 | Fan | |
| 7,930,045 B2 | 4/2011 | Cheng | |
| 8,145,329 B2 | 3/2012 | Pekar | |
| 8,504,175 B2 | 8/2013 | Pekar | |
| 10,358,771 B2 | 7/2019 | He | |
| 10,969,749 B2 | 4/2021 | Backstrom | |
| 2010/0087933 A1* | 4/2010 | Cheng | G05B 19/0423 700/30 |
| 2011/0288846 A1* | 11/2011 | Kihas | G05B 17/02 703/13 |
| 2016/0209815 A1* | 7/2016 | Blevins | G05B 13/02 |
| 2019/0127049 A1* | 5/2019 | Blanding | B64C 9/00 |
| 2020/0223423 A1* | 7/2020 | Haskara | B60W 10/06 |
| 2023/0125477 A1* | 4/2023 | Gurumurthy | G06N 3/08 382/103 |

* cited by examiner

*Primary Examiner* — Travis R Hunnings
(74) *Attorney, Agent, or Firm* — Seager, Tufte & Wickhem, LLP

(57)                    ABSTRACT

Predictive feedforward control whereby past and the planned movements of certain process input variables are used in planning the control of some selected process output variables without allowing for the impact of the certain process input variables on those selected process output variables to impact planned movements of the certain process input variables. Existing model-based predictive control systems can be modified by incorporating a control package that is encoded with the predictive feedforward technique to control industrial multivariable process systems. A method includes (a) identifying a dynamic process model for the multivariable process system; and (b) implementing a dedicated feedforward control whereby within the processing unit certain process input variable signals are used by the processing unit for planning control of selected process signal output variable signals by adjustment of other process input variable signals to one or more manipulated actuators without impact to the certain process input variable signals.

20 Claims, 7 Drawing Sheets

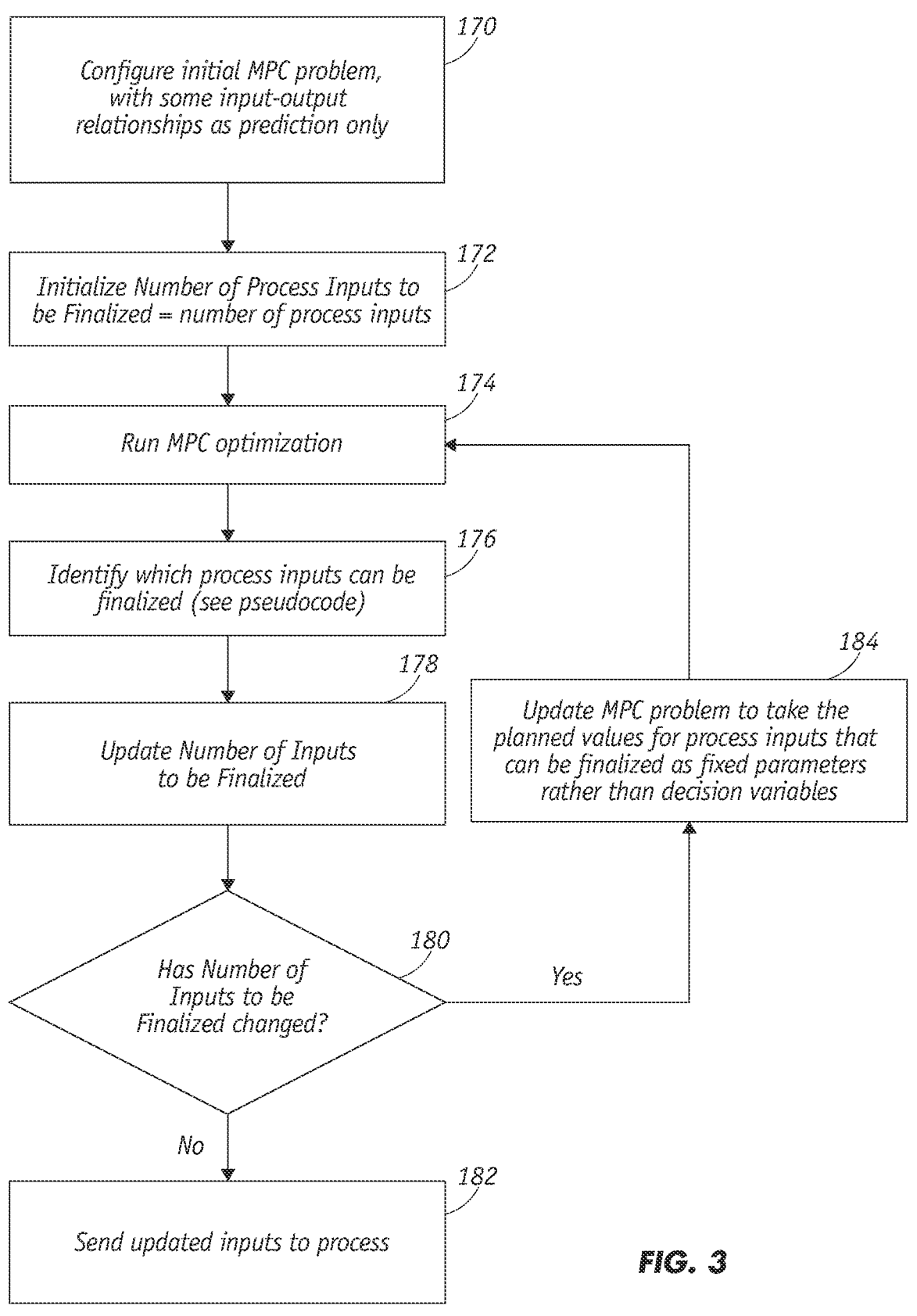

*170*

Configure initial MPC problem, with some input-output relationships as prediction only

*172*

Initialize Number of Process Inputs to be Finalized = number of process inputs

*174*

Run MPC optimization

*176*

Identify which process inputs can be finalized (see pseudocode)

*178*

Update Number of Inputs to be Finalized

*184*

Update MPC problem to take the planned values for process inputs that can be finalized as fixed parameters rather than decision variables

*180*

Has Number of Inputs to be Finalized changed?

Yes

No

*182*

Send updated inputs to process

*FIG. 3*

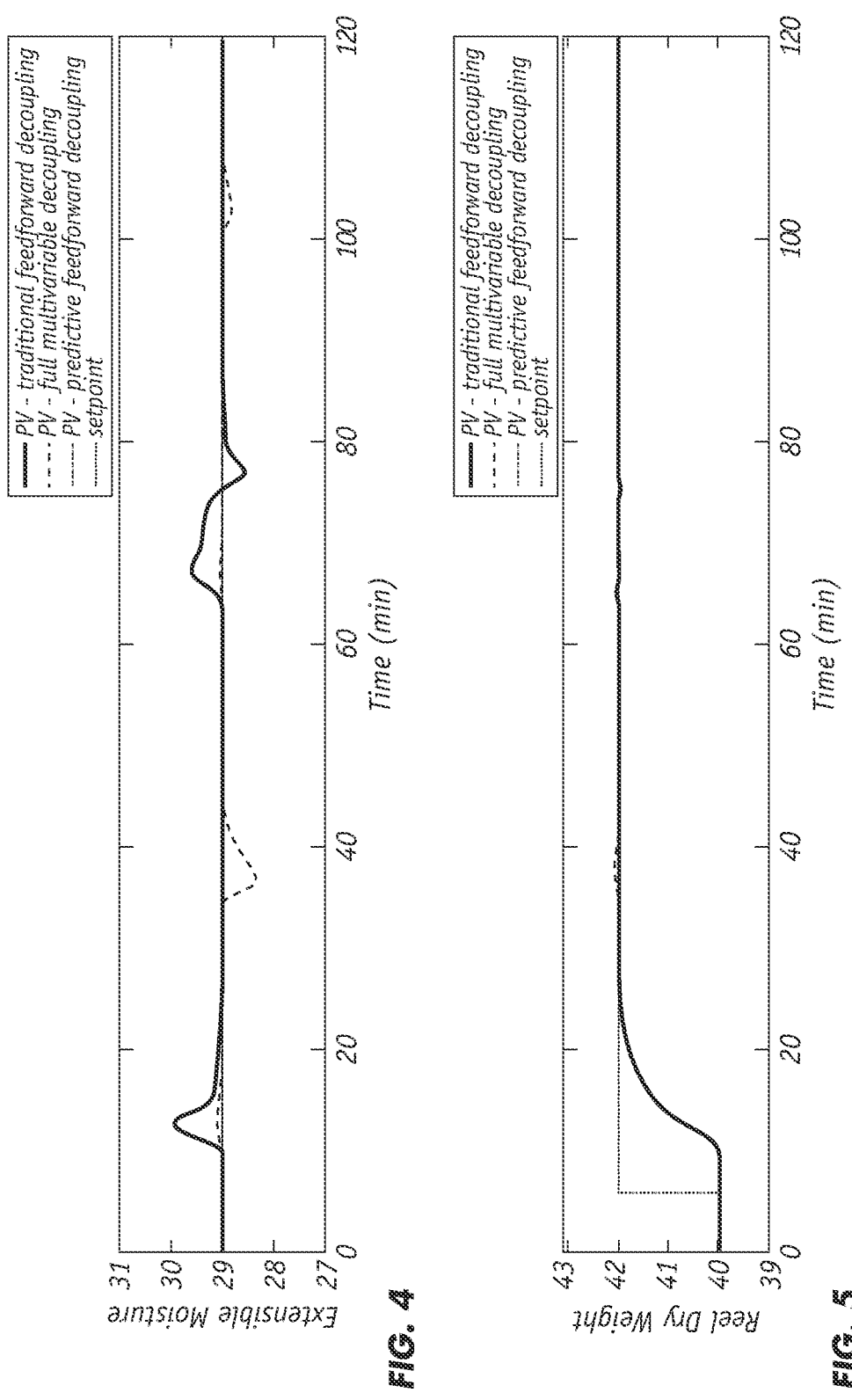

PREDICTIVE FEEDFORWARD CONTROL ALLOWING DEDICATED CONTROL OF SOME VARIABLES WHILE MINIMIZING IMPACT ON OTHER VARIABLES

FIELD OF THE INVENTION

The present invention generally relates to techniques for monitoring and controlling continuous systems and specifically to methods for predictive feedforward control of industrial processes that allow dedicated control of some output variables while minimizing the impact on other output variables.

BACKGROUND OF THE INVENTION

One of the benefits of multivariable process controls is that for processes with many inputs affecting many outputs, a multivariable controller can coordinate the movements of all of the process inputs to best control all of the process outputs. In model predictive control (MPC) the process input movements are chosen to minimize a cost function that typically includes weighted quadratic costs of the deviations of process outputs from their target values and the amount of process input movement. In contrast to traditional control techniques such as multiloop controls with feedforward, model-based predictive controls can coordinate input movements not only based on the past input movements but also for the future movements of all inputs over some horizon. In this way the movements of all inputs are planned to best control all outputs according to the importance of each output as established by the weighting in the cost function. By adjusting the weightings in the cost function, it is possible to design the MPC to make input moves that tightly control some outputs at the expense of tight control over other outputs. However, this tuning of the controller by adjustment of cost function weights is not straightforward and can require a time-consuming trial and error approach. Furthermore, there are some applications where the preference is that there be no trade-off; rather, one or more outputs should be controlled without any compromise, while the remaining outputs should be controlled as well as possible given the input movements required to best control the first set of outputs. For example, in paper machine control, it may be desired to manipulate stock flow strictly for the purpose of keeping dry weight on target. At the same time stock flow also affects moisture, and in such cases, it may be desirable to plan the steam section pressure movements that best control moisture given the stock flow movements that have been planned for dry weight control. Currently, there are no known MPC technologies that support this control scheme.

SUMMARY OF THE INVENTION

The present invention is based in part on the development of a predictive feedforward control whereby the past and the planned movements of certain process input variables are used in planning the control of some selected process output variables without allowing for the impact of the certain process input variables on those selected process output variables to impact the planned movements of the certain input variables. Existing model-based predictive control systems can be modified by incorporating an industrial control package that is encoded with the inventive technique which affords operators the option of executing the above-described feedforward control.

In one aspect, the invention is directed to a method of multivariable model predictive control (MPC) of an industrial multivariable process system, which produces a product material. The predictive feedforward technique is applicable to any multivariable industrial process such as petroleum and chemical including, for instance, distillation columns and sheet manufacturing including, for instance, plastics, lithium-ion battery electrodes, and paper and board fabrication.

The process system can include a (i) processing unit that receives controlled input variable signals and generates manipulated output variable signals (ii) a plurality of manipulated actuators that are adjustable to control the properties of the product material, and (iii) a plurality of sensors for measuring and acquiring property data of the product material. The number of manipulated actuators N can range from a few to hundreds in the case of complex multivariable industrial processes. Typically, N will range from 3 to 100. In one embodiment, said method includes:

(a) identifying a dynamic process model for the multivariable process system; and (b) implementing a feedforward control whereby within the processing unit certain process input variable signals are used by the processing unit for planning control of selected process output variable signals by adjustment of other process input variable signals to one or more manipulated actuators without impact to the certain process input variable signals.

In yet another aspect, the invention is directed to a MPC controller, for controlling properties of a product material that is produced in a multivariable industrial process. The controller includes a computer with processor and memory, a plurality of manipulated actuators that are adjustable to control the properties of a product material and a plurality of sensors configured to measure and acquire product data of the product material. The memory has a readable stored program for execution by the processor to:

(a) receive inputs from the sensors comprising product data of the product material;

(b) process a dynamic process model of the industrial process by implementing a feedforward control whereby control mode information about individual input-output relationships in the model as well as process output variables are provided to the processor wherein the impact of certain process input variables on selected process outputs is used for planning control of the selected process outputs by adjusting the other process inputs to one or more manipulated actuators of the plurality of manipulated actuators without impact to the certain process inputs; and (c) provide a controller output coupled to control properties of the product material.

In a further aspect, the invention is directed to a method of integrating a feedforward control into a MPC controller for controlling properties of a product material that is produced in an industrial multivariable process that employs (i) a plurality of manipulated actuators that are adjustable to control the properties of a product material and (ii) sensors for measuring and acquiring property data of the product material, wherein the industrial process is defined by a dynamic process model, said method including:

(a) designating one or more manipulated actuators from the plurality of manipulated actuators that affect one or more properties of the product material;

(b) assigning prediction function relationships to designated manipulated actuators;

(c) executing the feedforward control by operating the prediction functions to generate controller outputs for adjusting the designated manipulated actuators;

(d) receiving property data of the product material from the sensors;

(e) generating a control action by operating the MPC controller based on the property data from step (d) using an objective function.

BRIEF DESCRIPTION OF THE DRAWINGS

FIG. 3 illustrates a procedure for implementing the predictive feedforward control.

FIG. 4 is a graph of extensible moisture vs. time for a papermaking machine;

FIG. 5 is a graph of reel dry weight vs. time for a papermaking machine;

DETAILED DESCRIPTION OF PREFERRED EMBODIMENTS

Figure 1:
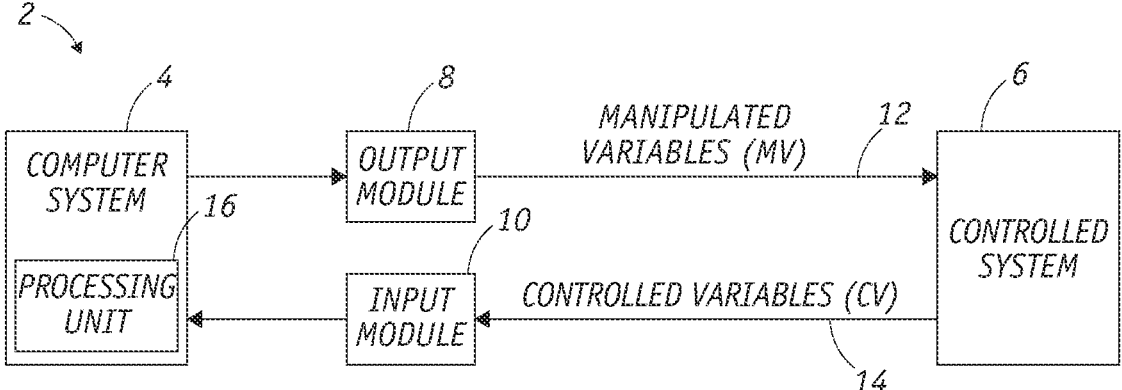
FIG. 1 is a control system incorporating an MPC controller.

FIG. 1 shows a controlled system 6 under the control of a controller 2 that includes a computer system 4, an output module 8, and an input module 10. In operation, controller 2 generates a sequence of manipulated variables (MVs) 12 from output module 8 and receives a sequence of controlled variables (CVs) (input variables) 14 from input module 10. Control outputs and inputs 12 and 14 may take the form of analog or digital control signals sent to and received from controlled system 6. The computer system 4 can include a processing unit 16 and memory (not shown). An application of the MPC system of FIG. 1 is for a papermaking machine wherein controller 2 is interfaced with a papermaking machine or components thereof during production.

Figure 2B:
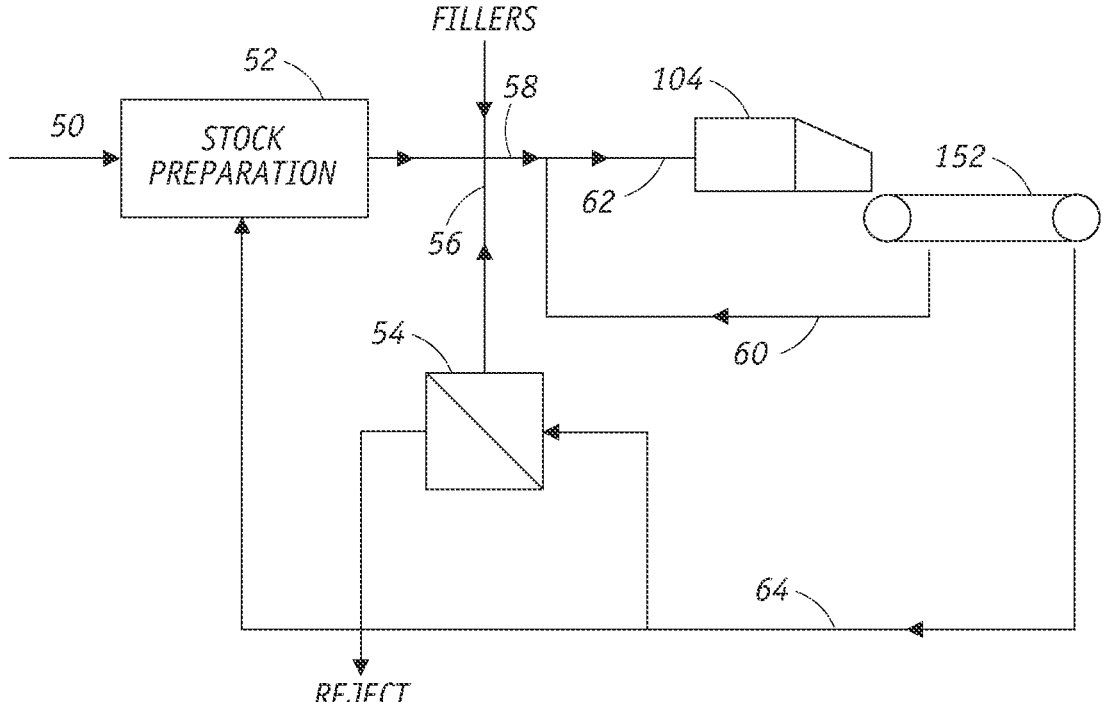
FIGS. 2A and 2B illustrate a paper production system.
Figure 2A:
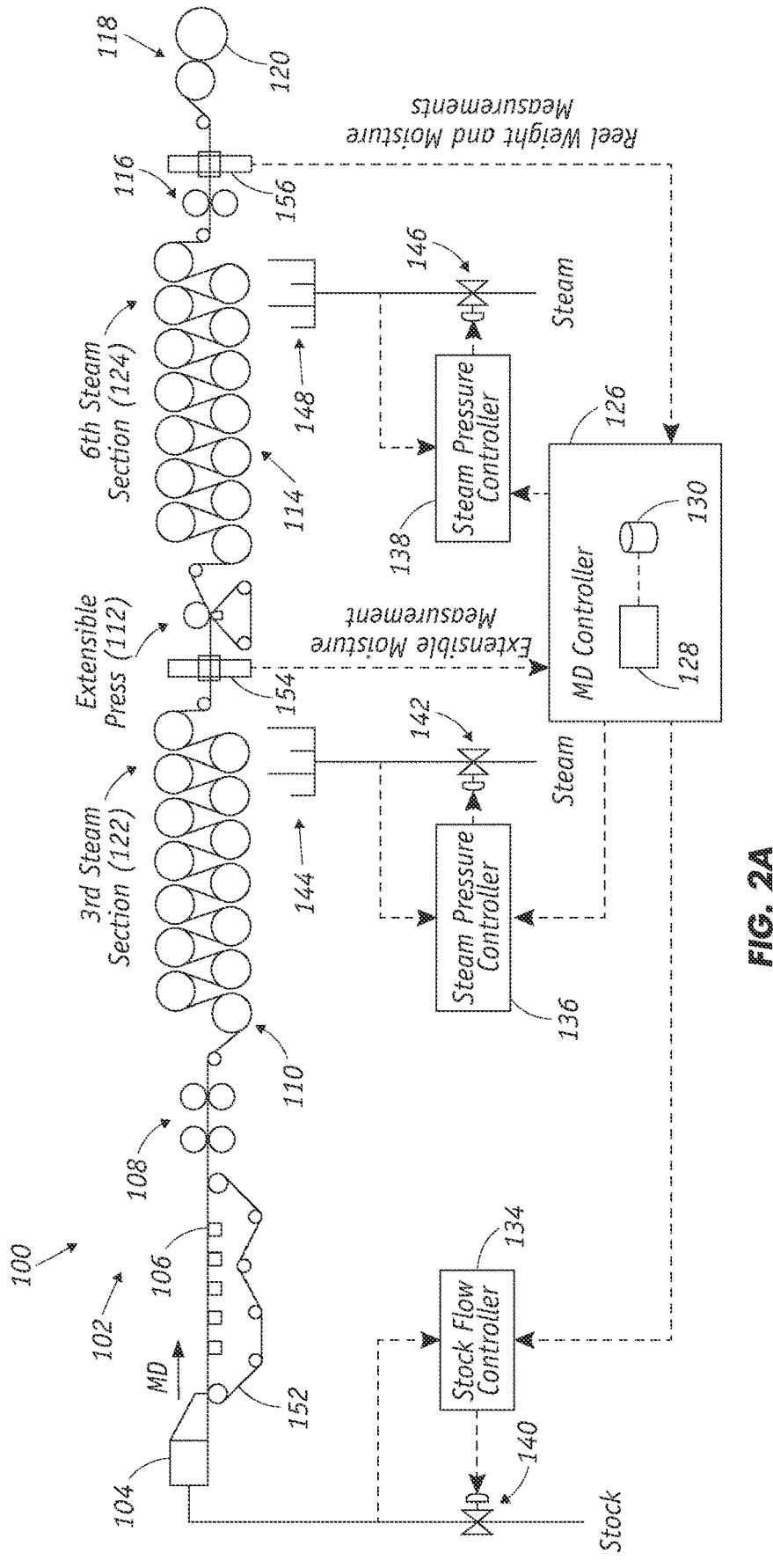

FIG. 2A illustrates an example paper production system 100 which includes a papermaking machine 102 which produces or processes a paper product 106 that is collected at a reel 120. The papermaking machine 102 includes a headbox 104, which distributes a pulp suspension uniformly across the machine onto a continuous moving screen or mesh 152. The pulp suspension stock entering the headbox 104 may contain, for example, 0.2-3% wood fibers and possibly other solids, with the remainder of the suspension being water. The headbox 104 includes a plurality of slice openings through which the pulp suspension is distributed along the width of the mesh 152. Water from the pulp suspension is drained through the circulating mesh 152 as the pulp advances in the machine direction (MD) to form a sheet 106 of paper material. Tachometers (not shown) as employed to measure the speed of the moving mesh 152.

The sheet 106 then enters a press section 108, which includes multiple press rolls. The sheet 106 travels through the openings (referred to as "nips") between pairs of counter-rotating rolls in the press section 108 which compress the pulp material forming the sheet 106 to remove more water from the pulp material and to equalize the characteristics on both sides of the sheet. The press section 108 may include a plurality of press rolls in any suitable arrangement for pressing the sheet 106.

The sheet 106 next travels over a series of heated rolls in a first dryer section 110 which causes more water from the sheet 106 to evaporate. Steam or any other heated substances is used to impart heat to the heated rolls. The first dryer section 110 includes a plurality of heated rolls for heating the sheet 106 and removing water therefrom. While the steam pressure for each heated roll can be regulated individually, in a preferred embodiment of the first dryer section, the plurality of heated rolls is grouped into three steam sections. For example, in the first dryer section 110 which has 14 heated rolls, the first steam section consists of the first 4 heated rolls, the second steam section consists of the next 6 heated rolls and the third steam section 122 consists of the last 4 heated rolls. Steam pressure controller 136 controls valve 142 to regulate the amount of steam that flows into the cylinders of the heated rolls of the third steam section through steam lines 144.

The sheet 106 passes through an extensible press 112 before traveling over a second series of heated rolls in a second dryer section 114. In a preferred embodiment, the 14 heated rolls are similarly grouped into three steam sections. For example, in the second dryer section 112 which has 14 heated rolls, the fourth steam section consists of the first 4 heated rolls, the fifth steam section consists of the next 6 heated rolls and the sixth steam section 124 consists of the last 4 heated rolls. Steam pressure controller 138 controls valve 146 to regulate the amount of steam that flows into the cylinders of the heated rolls of the sixth steam section 124 through steam lines 148.

A calender 116 processes and finishes the sheet 106 by, for example, smoothing the sheet and imparting a final finish, thickness, gloss, or other characteristic to the sheet. The calender 116 may include any suitable number of calender stacks. A reel device 118 collects the sheet onto the reel 120.

To control the papermaking process, the properties of the sheet 106 are continuously measured and the papermaking machine 102 adjusted to ensure sheet quality. For instance, scanner 154 scans the sheet 106 along the cross direction (CD) which is perpendicular to the MD and measures one or more characteristics of the sheet 106. For example, the scanner 154 could carry sensors for measuring the dry weight, extensible moisture content, ash content, and/or additional characteristics of the sheet. A scanning set of sensors represents one particular embodiment for measuring sheet properties. Other embodiments could include using a stationary set or array of sensors. Similarly, scanner 156 measures the reel weight, moisture content and/or additional characteristics of the finished paper.

Measurement signals from scanners 154 and 156 are sent to an MD controller 126 which controls various operations of the papermaking machine 102 that affect machine direction characteristics of the sheet 106. An MD characteristic of the sheet generally refers to an average characteristic of the sheet that varies and is controlled in the machine direction.

In this example, the stock flow controller 134 uses information from the MD controller 126 as well as measurements of the stock flow to the headbox 104 to regulate the stock flow through valve 140. The controller 126 is also capable of controlling the supply of steam to the first, second and third steam sections of the first dryer section 110 and to the fourth, fifth and sixth steam sections of the second dryer section 114. As illustrated, the controller 126 provides information to a steam pressure controller 136, which regulates valve 142 to control the steam pressure in the third steam section. The steam pressure controller 136 uses information from the MD controller 126 as well as measurements of the steam pressure to control the valve 142. Similarly, the controller 126 provides information to a steam pressure controller 138, which regulates valve 146 to control the steam pressure in the sixth steam section. The steam pressure controller 138 receives signals from the MD controller 126 and steam pressure measurements to control the valve 146.

The MD controller 126 includes any hardware, software, firmware, or combination thereof for controlling the operation of a paper or other machine. The MD controller 126 could, for example, comprise a computer which includes a processor 128 and memory 130, that stores instructions such as algorithms and data used, generated, or collected by the processor 128.

The stock supplied to the headbox 104 is prepared from pulp in the preparation unit 52 as shown in FIG. 2B where pulp fibers are cleaned and refined so that the pulp fibers have desired properties. The stock preparation unit 52 could also receive and process recycled fibers recovered from the screen or mesh 152. The fibers provided by the stock preparation unit 52 are mixed with one or more fillers and with recycled materials provided by a retention unit 54. The resulting mixture represents a thick stock 58 and has a relatively high fiber consistency (such as around 4%). The thick stock 58 is then mixed with white water in a short circulation path 60 to produce a thin stock 62, which has a relatively low fiber consistency (such as around 0.2%), and is supplied to the headbox 104. A long circulation path 64 provides recycled material to the retention unit 54 and the stock preparation unit 52 for recovery. Some of the material is rejected.

Dry stock is derived from stock. Physically stock is the cellulose fiber in the water suspension that flows from stream 50 into stock preparation unit 52. Stock is measured in volume/time. Part of that volume is water and some is solids (cellulose, some additives and fillers). The flow of the solids alone, without the water, is the dry stock flow. So dry stock is the dry component of the stock that flows into 52. Working in terms of dry stock means that one calculates the expected weight of the dry paper which makes the control of the papermaking machine easier.

FIGS. 2A and 2B represent one configuration of paper machine 102 that is used in the system 100. Other machines or devices could be used that include any other or additional components, such dryer sections, for producing a paper product. In addition, this disclosure is not limited to use with systems for producing or processing paper products and could be used with systems that produce or process other items or materials, such as plastic, textiles, metal foil or sheets.

A preferred technique of controlling the paper production system employs a model predictive control. Operation of MPC for coordinating cross direction and machine direction control initially involves the development of a plant model. In the case of a papermaking machine, this step is preferably accomplished by conducting bump tests followed by identifying a model. Next the prediction horizon and optimization weights are selected by tuning the MPC. Thereafter, the controller's performance is predicted using the optimal tuning parameters obtained.

Industrial implementation of MPC strategies is described for instance in U.S. Pat. No. 6,807,510 to Backstrom et al, U.S. Pat. No. 7,454,253 to Fan and U.S. Pat. No. 10,969,749 to Backstrom et al, which are incorporated herein by reference. The implementation includes an objective or cost function that is solvable to yield an array of optimal changes in the current actuator setpoints for coordinated MD and CD control of the sheet making process.

In multivariable control, the controller calculates the optimal future moves for the manipulated variables (the inputs to the process being controlled) with respect to some objective function. Typically, the objective or cost function involves a quadratic penalty on the predicted future deviations of the controlled variables (the outputs of the process being controlled) from some desired target or target range and some penalty on the movement of the manipulated variables. A process model is used to predict the future values of the controlled variables based on the past manipulated variable values as well as the planned future values, which are to be optimized. The process model accounts for the impacts of all manipulated variables on all controlled variables, and this allows the multivariable controller the potential to use any manipulated variable to contribute to the control of any controlled variable. However, in some cases it is desirable to plan some inputs moves without considering their impact on all of the outputs. Once those inputs moves are planned then their impacts on the all outputs can be considered and the other inputs can be planned to best control the outputs given the input moves that are already planned.

For example, in a simple paper machine control problem, the dry stock flow impacts both the final dry weight and the final moisture content of the paper. The final moisture content of the paper is also impacted by the dryer section steam pressure. In typical multivariable control, the controller would then choose the stock flow and steam moves over a control horizon that best control the weight and moisture over a prediction horizon. In some cases, it is desirable to have the control plan the stock flow moves without consideration of the moisture. The impact of the planned stock flow moves on the moisture can then be calculated and the steam pressure moves can be selected to control the moisture while compensating for the impact of the planned stock flow moves.

In general, it is necessary to break the optimization problem into a sequence of steps based on an order in which input moves can be planned. When more than a few variables are involved, this can become challenging, and a rigorous algorithm is needed to plan the optimization sequence. Simply adjusting the weighting factors in the MPC cost function would not yield a similar outcome as this can be time consuming and does not guarantee that inputs will be used strictly in accordance with user preferences.

FIG. 3 illustrates a method of implementing the predictive feedforward control. As is apparent, the inputs in FIG. 1 constitute the outputs in FIG. 3. In step 170, an operator configures the initial MPC problem for a plant by designating selected input-output relationships as being for prediction purposes only. Next in step 172, the number of process inputs to be finalized are initially set to be equal to the number of process inputs. A loop consisting of steps 174, 176, 178, 180 and 184 is used to run the MPC optimization, identify which process inputs be finalized, and update the number of inputs to be finalized. The loop continues if the number of inputs to be finalized has changed which case in step 184, the MPC problems is updated to take the planned values for process inputs that can be finalized as fixed parameters rather than as decision variables. In the final step 182, updated inputs are sent to the process.

By following this algorithm, the inputs that have been finalized and those still needing to be finalized can be determined. The MPC calculation can then be re-run taking the finalized input trajectories as fixed parameters, and when no more inputs can be finalized, the MPC calculations are finished.

To execute the predictive feedforward control, it is necessary to iteratively run the control calculation, each time finalizing any process inputs that no longer depend on updates to other process inputs. As more process inputs become finalized, there are fewer process inputs that can affect the remaining process inputs and eventually all process inputs can be finalized. This concept preferably employs an array of control modes. The array indicates how the controller may use modeled input-output relationships to choose process input values. If the control Mode for input j-output i is Control then the controller may use input j to help with the control of output i. If the mode is Prediction Only, then the controller accounts for but does not change the values for input j to help with the control of output i. If the mode is none, there is no modeled relationship between input j and output i.

TABLE 1

Example Array of Control Modes (for a 3 output - 3 input system)

| | Input 1 | Input 2 | Input 3 |
|---|---|---|---|
| Output 1 | Control | Prediction Only | None |
| Output 2 | Prediction Only | Control | None |
| Output 3 | Prediction Only | Control | Control |

The following pseudocode listing gives an algorithm for updating after each controller calculation which inputs can be finalized. The algorithm can be coded in a programming language such as MATLAB or PYTHON, or any other appropriate language and integrated into an industrial control package capable of receiving measurement from an industrial process, executing the control algorithm, and returning process input values back to the industrial process.

In this pseudocode, if there is a two-dimensional array x, then the notation x(:, j) refers to the all rows in the jth column of x; similarly, x(i,:) refers to all columns of the ith row of x. The operator any(x) can take an array argument and returns the value True if any element of x is true (otherwise it returns False). For example, any(controlMode (:,k))=Control will return a value of True if any element of the kth column of controlMode has a value equal to Control. The operator is equal(x,y) will return True if the two arrays are equal, and False otherwise. The operator sum(x) gives the sum of the elements in x.

Determining Inputs That Can be Finalized

```
Before first iteration:
InputsToBeFinalized = array of ones equal in length to number of inputs
After each iteration:
mvsInterdependencies = array of zeros of size number of inputs x
number of inputs
for j from 1 to number of inputs
    if InputsToBeFinalized (j)=1
        for i from 1 to number of outputs
            if controlMode(i,j) = Control
                for k from 1 to number of inputs
                    if InputsToBeFinalized (k)=1 and controlMode(i,k) ≠
None and any(controlMode(:,k)-Control)
                        mvsInterdependencies(j,k)=1;
                    end
```

-continued

Determining Inputs That Can be Finalized

```
            end
          end
        end
      end
    end
initialMVsInterdependencies = mvsInterdependencies;
keepChecking = 1
while keepChecking=1
    for i from 1 to number of inputs
        for j from 1 to number of inputs
            if mvsInterdependencies(i,j)=1
                for k from 1 to number of inputs
                    if mvsInterdependencies(j,k)=1
                        mvsInterdependencies(i,k)=1
                    end
                end
            end
        end
    end
    if isequal(mvsInterdependencies, initialMVsInterdependencies)
        keepChecking = 0
    else
        initialMVsInterdependencies = mvsInterdependencies
    end
end
for i from 1 to number of inputs
    if InputsToBeFinalized(i) ≠0
        if mvsInterdependencies(i,i)=1 and sum(mvsInterdependencies
        (i,:))=1
            mvsToControl(i) = 0
        elseif sum(mvsInterdependencies(i,:))>=1
            depInds = indexes where mvsInterdependencies(i,:) = 1
            canDrop = 1
            for j from 1 to number of entries in depInds
                if
~isequal(mvsInterdependencies(i,:),mvsInterdependencies(depInds(j),:))
                    canDrop = 0
                end
            end
            if canDrop=1
                for from 1 to number of entries in depInds
                    InputsToBeFinalized (depInds(j)) = 0
                end
            end
        end
    end
end
```

To demonstrate the effectiveness of the predictive feedforward technique of the present invention, a computer simulated comparative study of paper machine MD controls was conducted using the papermaking machine illustrated in FIG. 2. Three different MD control strategies were compared. Three control variables were controlled: (i) extensible moisture (as measured by scanner 154), (ii) reel dry weight (scanner 156), and (iii) reel moisture (scanner 156). These three variables were controlled by adjustment of three manipulated variables: (i) dry stock flow, (ii) 6th steam section steam pressure, and (iii) 3rd steam section steam pressure. In addition, the machine direction speed was ramped in the middle of the case study, beginning just after 60 minutes. Machine speed is not used as a manipulated variable in the closed-loop control but it does have an impact on the controlled variables and must be compensated for with the adjustment of the manipulated variables. In this system there are different time delays between moving a manipulated variable and seeing the effect of the movement on the controlled variables. Table 2 provides the process model and controller mode for each input (manipulated variable MV) to each output (controlled variable, CV) used in this study.

9

TABLE 2

| Process Dynamics and Predictive Feedforward Control Modes | Dry Stock Flow | Machine Speed | 6th Dryer Steam Section Pressure | 3rd Dryer Steam Section Pressure |
|---|---|---|---|---|
| Extensible Moisture | Gain: 0.89 Time Delay: 100 s Time Constant: 114 s Mode: Prediction Only | Not modeled | No impact | Gain: −0.39 Time Delay: 200 s Time Constant: 75 s Mode: Control |
| Reel Dry Weight | Gain: 0.49 Time Delay: 110 s Time Constant: 120 s Mode: Control | Gain: −0.012 Time Delay: 115 s Time Constant: 23 s Mode: Prediction Only | No impact | No impact |
| Reel Moisture | Gain: 0.62 Time Delay: 100 s Time Constant: 126 s Mode: Prediction Only | Not modeled | Gain: −0.11 Time Delay: 300 s Time Constant: 85 s Mode: Control | Gain: −0.30 Time Delay: 200 s Time Constant: 75 s Mode: Prediction Only |

In this example, linear first-order plus time delay models are used. These are models with first-order dynamics and time delays.

For the parameters gain=k, time delay=0, time constant=t, the dynamic model from the MV (=u) to the CV (=y) take the form of the differential equation:

$$\tau \frac{dy(t)}{dt} = -y(t) + ku(t - \theta)$$

This equation is often represented as the Laplace transfer function:

$$Y(s) = \frac{k\theta^{-\theta s}}{\tau s + 1} U(s)$$

Three different control strategies were employed: (i) traditional feedforward decoupling, (ii) full multivariable decoupling and (iii) predictive feedforward decoupling of the present invention.

FIG. 4 shows the extensible moisture that is measured as the papermaking machine is operated under the three different control strategies over the course of two hours.

FIG. 5 shows the reel dry weight that is measured as the papermaking machine is operated under the three different control strategies.

Figures 6, 7:
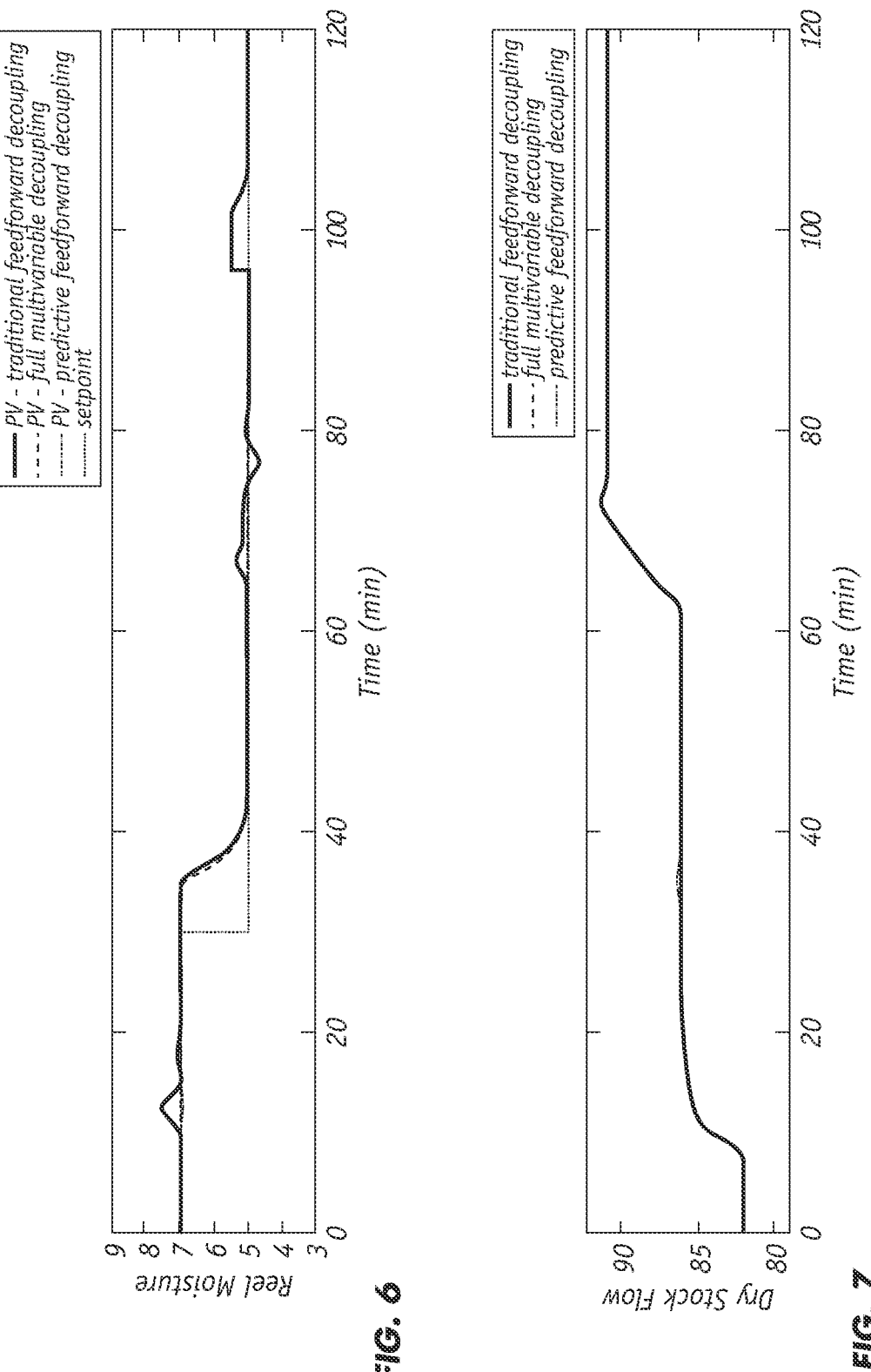
FIG. 6 is a graph of reel moisture vs. time for a papermaking machine.
FIG. 7 is a graph of dry stock flow vs. time for a papermaking machine.

FIG. 6 shows the moisture of the paper at the reel as the papermaking machine is operated under the three different control strategies.

FIG. 7 shows the dry stock flow into the headbox as the papermaking machine is operated under the three different control strategies.

Figures 8, 9:
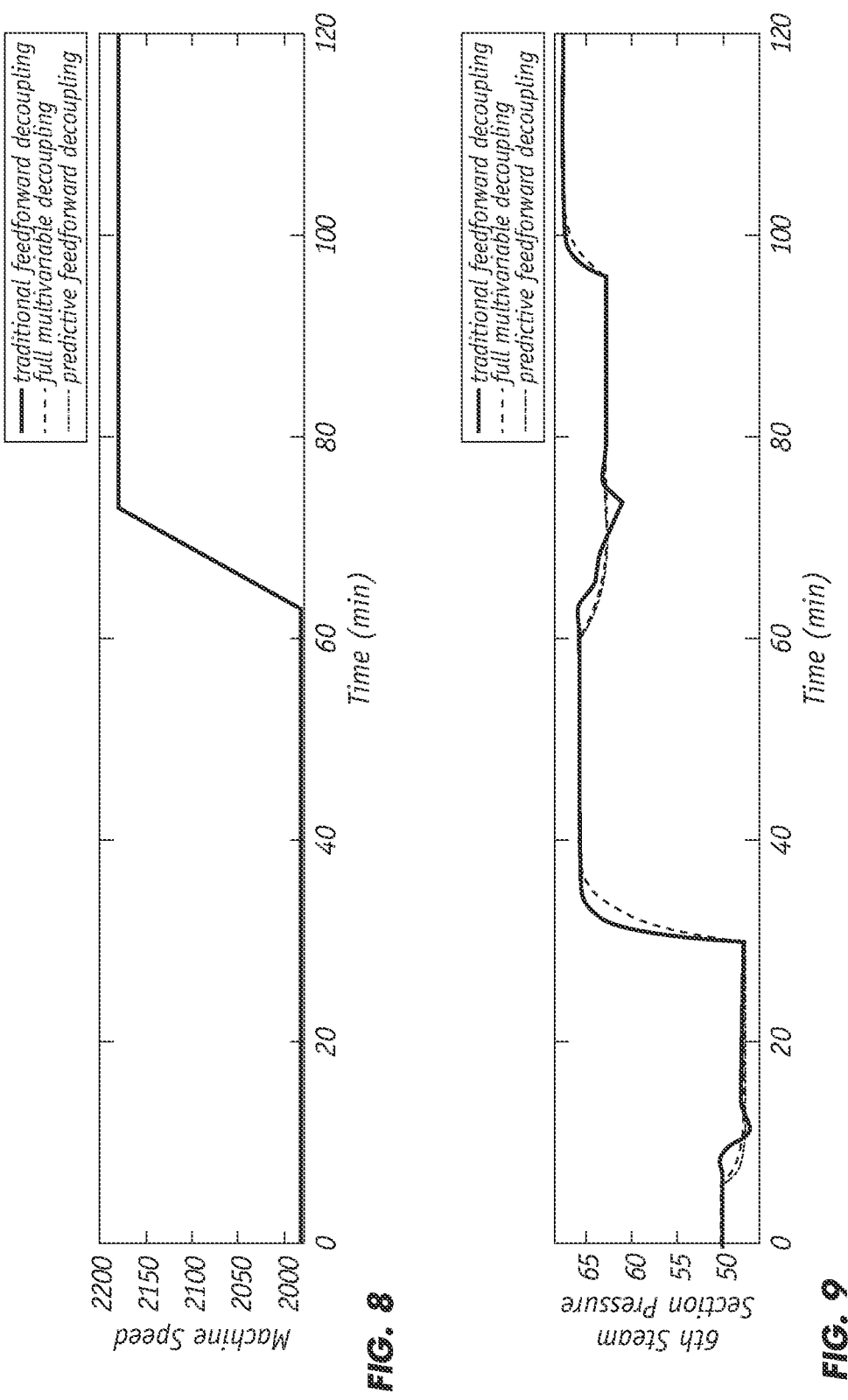
FIG. 8 is a graph of machine speed vs. time for a papermaking machine.
FIG. 9 is a graph of $6^{th}$ steam section steam pressure vs. time for a papermaking machine.

FIG. 8 shows the machine speed as the papermaking machine is operated under the three different control strategies.

FIG. 9 shows the 6$^{th}$ steam section steam pressure as the papermaking machine is operated under the three different control strategies.

Figure 10:
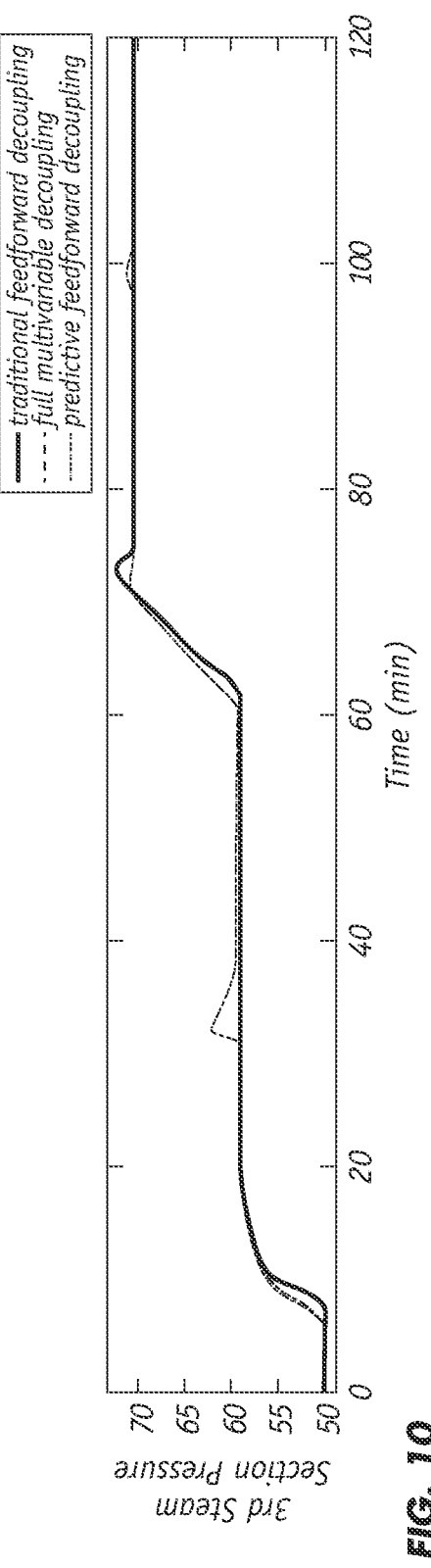
FIG. 10 is a graph of $3^{rd}$ steam section steam pressure vs. time for a papermaking machine.

FIG. 10 shows the 3$^{rd}$ steam section steam pressure as the papermaking machine is operated under the three different control strategies.

With traditional feedforward decoupling, the extensible moisture is controlled by manipulating the 3rd section steam pressure; the reel dry weight is controlled by manipulating the dry stock flow, and the reel moisture is controlled by manipulating the 6th steam section steam pressure. Additional feedforward controls help to lessen the impact of dry stock flow on the extensible and reel moisture and the impact of 3rd steam section steam pressure on reel moisture. It can be seen that with this strategy, in spite of the feedforward decoupling, there is still some disturbance to the extensible moisture and reel moisture when the dry stock flow is moved to change the reel dry weight to a new value (prior to the 20-minute mark). This is because the time delay for stock flow to affect the moistures is less than the time delay for the steam section pressures to affect the moistures. On the other hand, since there are three independent control loops, stock flow and 3rd steam section steam pressure are not moved when the setpoint for the reel moisture is changed. Therefore, there are no disturbances to the reel dry weight or the extensible moisture (between 20 and 50 minutes) during this event.

With the full multivariable strategy, all three manipulated variables are adjusted to control all three controlled variables with a minimum of overall error. In this case the coordination of the control moves is improved for the reel dry weight setpoint change (the event prior to the 20-minute mark), where the 3rd steam section steam pressure and 6th steam section steam pressure are moved earlier and consequently the disturbance to the extensible moisture and to the reel moisture is very small. However, for the reel moisture setpoint change (20 to 50 minutes), the controller makes a small transient move to the dry stock flow and also to the 3rd steam pressure to allow the reel moisture setpoint change to occur more quickly, at the expense of small temporary disturbances to the extensible moisture and the dry weight. Although this trade-off can be managed through tuning, the trade-off is an inherent part of the full multivariable control. Some customers would prefer that these temporary moves, however small, not occur at all.

What is desired is a controller that has the best aspects of the traditional feedforward decoupling which prevents unnecessary transient disturbances due to overall minimization of CV errors (as shown in the 20-50 minutes part of the graphs) but still optimally coordinates MV movements when movements of more than 1 MV are needed to keep all CVs tracking their setpoints (as shown in the part of the graphs before the 20 minute mark). This is what is provided by the present invention, the third strategy, predictive feedforward decoupling. As can be seen in the set of graphs, with this strategy the movements of the 3 MVs are perfectly coordinated for the reel dry weight setpoint change (the event prior to 20 minutes). The dry weight is moved to the new setpoint with no disturbance to extensible moisture or to reel moisture. The performance for the reel moisture setpoint change (the event between 20 and 50 minutes) is also good. The reel moisture is moved to the new setpoint without any disturbance to the extensible moisture or to the reel dry weight. This exemplifies the beneficial behavior of the invention.

The other two events shown in the graphs are a change in machine speed between 60 and 80 minutes which requires changes to the 3 MVs to mitigate disturbances to the CVS, and a set disturbance to the reel moisture (between 90 and 110 minutes) which requires correction. Both of these events serve to demonstrate the feedforward strategy handles these events as desired, avoiding and optimally correcting disturbances without allowing small disturbances to some CVs to reduce disturbances to other CVs.

The foregoing has described the principles, preferred embodiment and modes of operation of the present invention. However, the invention should not be construed as limited to the particular embodiments discussed. Instead, the above-described embodiments should be regarded as illustrative rather than restrictive, and it should be appreciated that variations may be made in those embodiments by workers skilled in the art without departing from the scope of present invention as defined by the following claims.

What is claimed is:

1. A method of multivariable model predictive control (MPC) of an industrial multivariable process system, which produces a product material, that includes a (i) processing unit that receives controlled process output variable signals as inputs and generates manipulated process input variable signals as outputs (ii) a plurality of manipulated actuators that are adjustable to control the properties of the product material, and (iii) a plurality of sensors for measuring and acquiring property data of the product material, said method comprises:

(a) identifying a dynamic process model for the multivariable process system; and (b) implementing a feedforward control whereby within the processing unit certain process input variable signals are used by the processing unit for planning control of selected process output variable signals by adjustment of other process input variable signals to one or more manipulated actuators without impact to the certain process input variable signals.

2. The method of claim 1 wherein the plurality of manipulated actuators comprises N number of manipulated actuators and each manipulated actuator affects one or more properties of the material produced by the industrial process system.

3. The method of claim 2 wherein the feedforward control is configured with an array of control modes wherein how the industrial multivariable process system uses each manipulated actuator material property relationship as given by the dynamic process model, is defined by the corresponding control mode.

4. The method of claim 3 wherein each control mode is set by designating relationships between a manipulated actuator adjustment and a corresponding property changes as being (i) a control output function, (ii) a prediction function or (iii) no function, wherein when a manipulated actuator is set in control output function, the input to the processing unit generates a defined output for a manipulated actuator, wherein when a manipulated actuator is set in prediction function the processing unit accounts for the input but does not change the output and wherein when a manipulated actuator is set in no function, the processing unit does not account for the input.

5. The method of claim 4 wherein the processing unit employs the dynamic process model to implement the feedforward control by employing the array of control modes to employ a plurality of relationships between manipulated actuator adjustment and a corresponding property changes to generate process input values.

6. The method of claim 5 wherein identifying the dynamic process model comprises configuring an initial MPC problem, with some input-output relationships designated as prediction function and implementing the feedforward control comprises:

(i) initializing number of process inputs to be finalized to equal number of process inputs;

(ii) executing MPC optimization;

(iii) identifying which process inputs can be finalized;

(iv) updating number of inputs to be finalized;

(v) updating the number of inputs to be finalized, wherein if the number of inputs to be finalized has changed, then (vi) updating the MPC problem to take the planned values for process outputs that can be finalized as fixed parameters rather than decision variables and repeating steps (iii), (iv), (v) and (vii) until there is no change in the number of inputs to be finalized; and (viii) sending updated inputs to the process.

7. The method of claim 1 wherein the industrial multivariable process system is a (i) chemical or petroleum process or (ii) sheet manufacturing process.

8. A model predictive control (MPC) controller for controlling properties of a product material that is produced in a multivariable industrial process comprising:

a processor;

a plurality of manipulated actuators that are adjustable to control the properties of a product material;

a plurality of sensors configured to measure and acquire product data of the product material; and a memory device coupled to the processor and comprising a readable program for execution by the processor to:

(a) receive inputs from the sensors comprising product data of the product material;

(b) process a dynamic process model of the industrial process by implementing a feedforward control whereby within the processor certain inputs are used by the processor for planning control of selected process outputs by adjustment of other process inputs to one or more manipulated actuators of the plurality of manipulated actuators without the impact to the certain process inputs; and (c) provide a process input as the controller output coupled to control properties of the product material.

9. The controller of claim 8 wherein the plurality of manipulated actuators comprises N number of manipulated actuators and each manipulated actuator affects one or more properties of the material produced by the industrial process.

10. The controller of claim 9 wherein the feedforward control is configured with an array of control modes wherein how the controller uses each manipulated actuator material property relationship as given by the dynamic process model, is defined by the corresponding control mode.

11. The method of claim 10 wherein each control mode is set by designating relationships between a manipulated actuator adjustment and a corresponding property changes as being (i) a control output function, (ii) a prediction function or (iii) no function, wherein when a manipulated actuator is set in control output function, the input to the processing unit generates a defined output for a manipulated actuator, wherein when a manipulated actuator is set in prediction function the processing unit accounts for the input but does not change the output and wherein when a manipulated actuator is set in no function, the processor does not account for the input.

12. The controller of claim 11 wherein the processor unit employs the dynamic process model to implement the feedforward control by employing the array of control modes to employ a plurality of relationships between manipulated actuator adjustment and a corresponding property changes to generate process input values.

13. A method of integrating a feedforward control into a model predictive control (MPC) controller for controlling properties of a product material that is produced in an industrial multivariable process that employs (i) a plurality of manipulated actuators that are adjustable to control the properties of a product material and (ii) sensors for measuring and acquiring property data of the product material, wherein the industrial process is defined by a dynamic process model comprising:

(a) designating one or more manipulated actuators from the plurality of manipulated actuators that affect one or more properties of the product material;

(b) assigning prediction function relationships to designated manipulated actuators;

(c) executing the feedforward control by operating the prediction functions to generate outputs for adjusting the designated manipulated actuators;

(d) receiving property data of the product material from the sensors;

(e) generating a control action by operating the MPC controller based on the property data from step (d) using an objective function.

14. The method of claim 13 wherein prior to step (e), repeating steps (c) and (d) until there is no change in property data received in step (d).

15. The method of claim 13 wherein step (c) generates outputs dedicated to adjust selected manipulated actuators with minimal impact on non-selected manipulated actuators.

16. The method of claim 13 wherein the plurality of manipulated actuators comprises N number of manipulated actuators and each manipulated actuator affects one or more properties of the material produced by the industrial process system.

17. The method of claim 16 wherein the feedforward control is configured with an array of control modes wherein how the controller uses each manipulated actuator material property relationship as given by the dynamic process model, is defined by the corresponding control mode.

18. The method of claim 17 wherein each control mode is set by designating relationships between a manipulated actuator adjustment and a corresponding property changes as being (i) a control output function, (ii) a prediction function or (iii) no function, wherein when a manipulated actuator is set in control output function, the input to the controller generates a defined output for a manipulated actuator, wherein when a manipulated actuator is set in prediction function the processing unit accounts for the input but does not change the output and wherein when a manipulated actuator is set in no function, the controller does not account for the input.

19. The method of claim 18 wherein the controller employs the dynamic process model to implement the feedforward control by employing the array of control modes to employ a plurality of relationships between manipulated actuator adjustment and a corresponding property changes to generate process input values.

20. The method of claim 13 wherein the industrial multivariable process system is a (i) chemical or petroleum process or (ii) sheet manufacturing process.

\* \* \* \* \*